No. 661,553. Patented Nov. 13, 1900.
A. L. RIKER.
RUNNING GEAR FOR MOTOR VEHICLES.
(Application filed Jan. 17, 1899.)
(No Model.) 2 Sheets—Sheet 2.
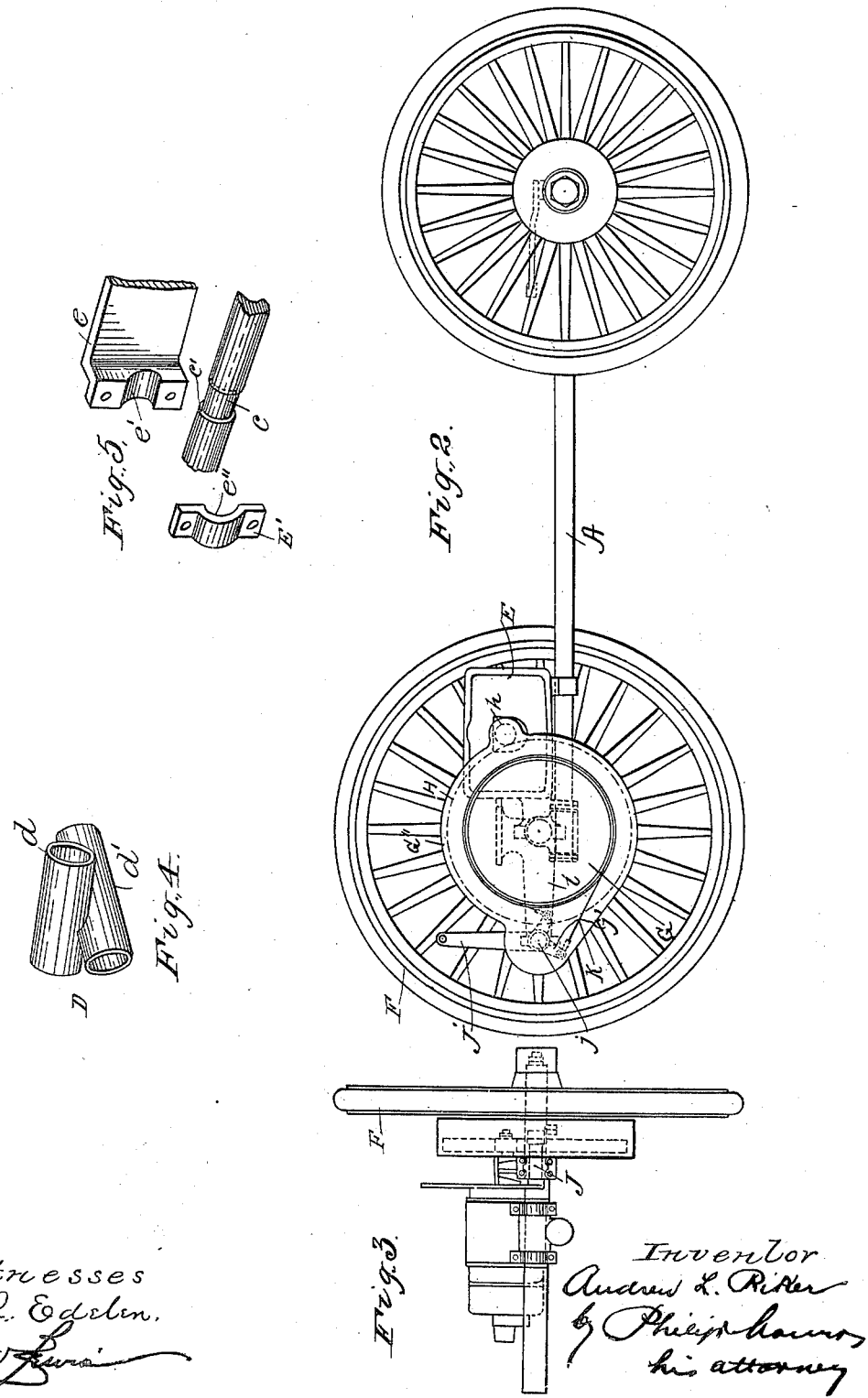

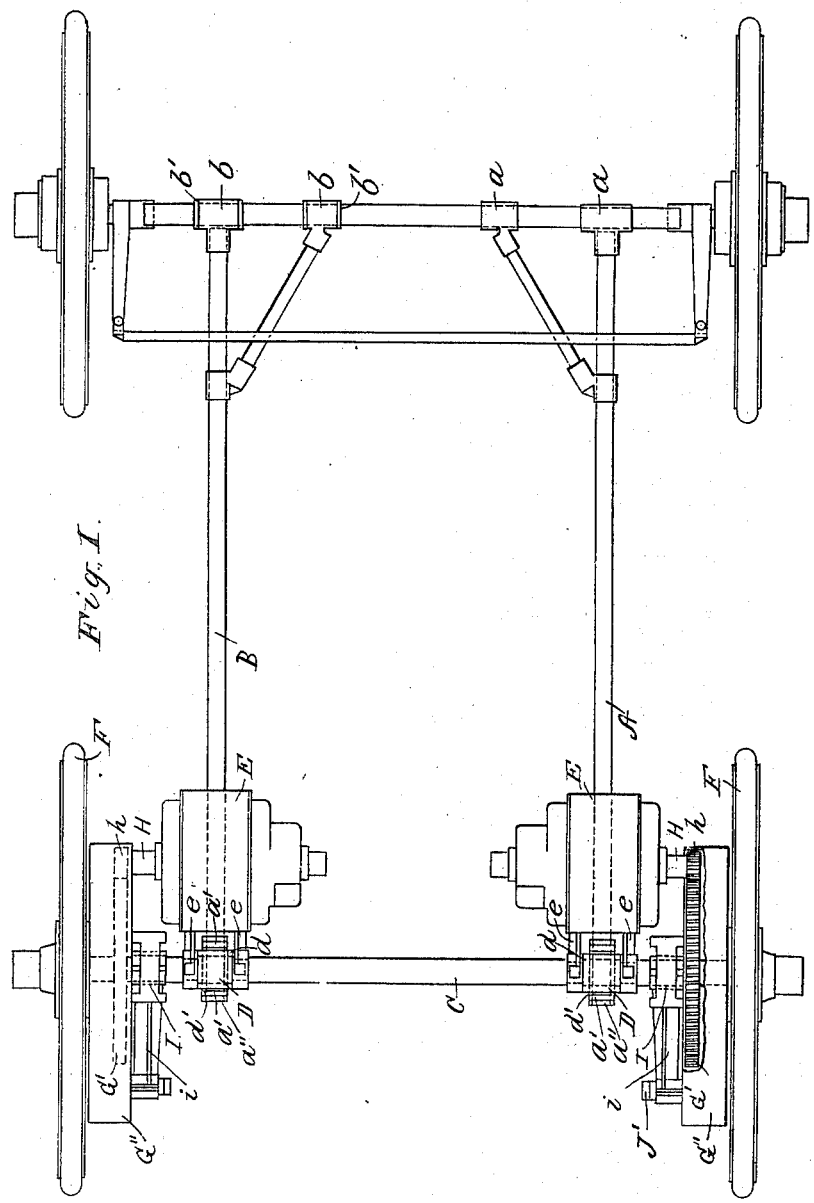

UNITED STATES PATENT OFFICE.

ANDREW L. RIKER, OF STAMFORD, CONNECTICUT.

RUNNING-GEAR FOR MOTOR-VEHICLES.

SPECIFICATION forming part of Letters Patent No. 661,553, dated November 13, 1900.

Application filed January 17, 1899. Serial No. 702,452. (No model.)

*To all whom it may concern:*

Be it known that I, ANDREW L. RIKER, of Stamford, Connecticut, have invented a new and useful Running-Gear for Motor-Vehicles, which is fully set forth in the following specification.

My invention relates to certain improvements in motor-cycles, and more particularly to improvements in running-gear of the type disclosed in my pending application for United States Letters Patent, filed February 11, 1898, Serial No. 669,947.

The objects of the present invention are to simplify the construction, to provide a stronger rear axle, to employ two independent motors instead of one, to dispense with certain complicated and costly parts, and to rearrange the various parts in a way that shall be stronger, more compact, and more useful.

In the drawings annexed hereto and made a part of this specification, Figure 1 is a plan view of my improved running-gear. Fig. 2 is a side elevation of the same; Fig. 3, a rear elevation showing one wheel only and a portion of the rear axle, with the adjacent parts. Fig. 4 is a detail showing one of the double coupling-pieces for connecting the rear axle with the side bars. Fig. 5 shows in perspective one of the rearward arms of the motor-casing, the plate for fastening it to the axle, and that portion of the axle clamped thereby.

The frame of the running-gear proper consists of the front and rear axles and two side bars connecting them. One side bar, A, and its brace are rigidly secured to the front axle, as by couplings $a$, while the other, B, and its brace are connected loosely, as by sleeves $b$, free to turn on the axle between collars $b'$. These connections, as well as the manner of mounting the fore wheels and the steering apparatus, are just as in my pending application already referred to and need not be further described. The rear axle C (instead of being a compound hollow axle, as in my former application) may be solid and in one piece or unitary, and the rear wheels are mounted to turn freely on spindles on the ends of the axle. The side bars are connected to the rear axle in such a manner as to preserve rigidly the (substantially) rectangular form of the frame while permitting the parts such play as to allow any wheel to sink into a rut or rise over an obstruction without straining the joints. The couplings connecting the rear axle with the rear ends of the side bars may be of any form that will accomplish the result desired and pointed out—as, for example, that shown in my former application. I have devised another way of connecting these parts which I find very convenient and will now describe: A double swivel or coupling-piece D, consisting of two sleeves $d\ d'$ in one piece and at right angles to each other, is provided for each side bar. The sleeves loosely surround the rear axle and the rear end of the side bar, respectively. I find it desirable to have the upper sleeve surround the axle, while the lower sleeve surrounds the side bar. The sleeve $d'$ is held from longitudinal movement on the side bar by collar $a'$ and nut $a''$ on the latter. Sleeve $d$ is held from moving sidewise on the axle by the two rearwardly-extending arms of each motor-frame, that are themselves held in a manner to be hereinafter described. The advantage of securing the side bar below the rear axle is that (since the front axle is lower than the rear axle) the side bar would have to be bent and correspondingly weakened if its rear end were secured above the rear axle or in the same horizontal plane with it as its forward end is to the front axle; but when the side bar is secured to the axles as in the present invention it may be made straight, and consequently stronger.

When a vehicle changes its direction in making a turn, one rear wheel (of course) rotates at a different rate from the other. In fact, the inner wheel sometimes turns backward. Hitherto provision has been made for this in vehicles of this type by employing a two-part axle or a hollow compound axle with differential gearing. My present invention retains the simple and strong axle, but (instead of employing one motor near the middle of the axle) I make use of two motors, one near each end of the axle close to the wheel. This not only allows the wheels to be driven independently, which is essential in turning the vehicle, but permits the continuous unitary axle to be used and dispenses with differential gearing. Besides the weight is distributed and carried nearer the wheels, so as to prevent any strain or sagging of the axle. I prefer to fix the motors in place in the manner to be described. As the two are alike and mounted in the same way, I shall describe only one. The motor is inclosed in a suitable casing E, which I find it desirable to place above the frame of the running-gear instead of below, where it is liable to strike against obstructions. This casing is provided with two rearwardly-extending arms $e$, the distance between which just equals the length of sleeve $d$ of coupling-piece D. Each arm has in its rear face a horizontal semicylindrical groove $e'$, slightly smaller in diameter than the axle. The motor is placed upon the frame and these arms fit snugly on either side of sleeve $d$, the grooves $e'$ embracing cylindrical portions $c$ of the axle that have been reduced to fit $e'$ loosely, and plates E', having grooves $e''$, corresponding to grooves $e'$, are fastened to the rear faces of arms $e$, clamping the latter securely to the axle. The shoulders $c'$ on the axle hold the arms $e$ from longitudinal movement thereon as the arms hold sleeve $d$. The forward end of the motor-casing is supported by the side bar in any convenient way and may have a pivoted intermediate support, interposed springs, or both. The advantage of placing the motor above the running-gear is particularly noticeable in winter when snow-drifts are piled in the roadway. It will be seen that the motor is carried entirely by the running-gear and is altogether independent of the vehicle-body. One body may be readily taken off and another put in its place without interfering with the motor at all.

The rear wheels F turn on spindles on the rear axle, as already indicated. Fast on each wheel are the brake wheel or drum G and the drive-gear G'. The latter may be an ordinary radial-toothed gear. Wheel F is of any preferred style, but does not require a specially-constructed hub with beveled gear-teeth, &c. Driving-shaft H from the motor extends through casing E and carries drive-pinions $h$ in mesh with gear G'. While the brake mechanism may be carried in any desirable way, I find it convenient to locate it on the spring-support. The spring-supports I are mounted on the axle, one near each end between the motor and the wheel. From each support extends, preferably rearward, an arm $i$, that serves as a bearing, in which turns the brake-shaft J. At one end of shaft J is brake-lever J', and at the other end in the plane of drum G are the two arms $j$, to which are attached the ends of brake-band K, passing around brake-drum G, all as shown. Gear-wheel G', driving-pinion $h$, brake-drum G, and the inner end of the brake-shaft with band K may be protected by a suitable casing G'', which can conveniently be attached to the axle and spring-support I. I have shown the brake-drum as next the wheel, while the drive-gear is next the motor. I prefer this construction because in it the drive-shaft H is shorter and is not subject to so much strain as in case it had to pass beyond the brake-wheel, (which is preferably wider than the drive-gear,) yet these two parts may be transposed, placing the brake-wheel next the motor and the drive-gear next the wheel without departing from the spirit of my invention.

I do not wish to be understood as confining myself to the exact constructions as shown and described, for changes in the construction may be made or some features may be used to the exclusion of others without in either case departing from the spirit of my invention.

I claim—

1. The running-gear frame consisting of the front axle, the continuous and unitary non-revoluble rear axle, and the two side bars connecting them, one of said side bars being connected rigidly to the front axle and loosely to the rear axle, and the other side bar being connected loosely to both axles, substantially as described.

2. In a running-gear, the side bar connected rigidly to the front axle in the same horizontal plane therewith, and connected to the rear axle loosely and below the same, substantially as described.

3. In a running-gear, the side bar connected by a swivel-joint to the front axle in the same horizontal plane therewith, and connected by a double swivel to the rear axle below the same, substantially as described.

4. In a running-gear, the side bar connected by a swivel-joint to the front axle and by a double swivel-joint to the rear axle, substantially as described.

5. A running-gear frame consisting of the two continuous and non-revoluble axles and two side bars connecting them, in combination with two independent motors each located near the end of the rear axle and geared to drive the adjacent wheel, substantially as described.

6. In a running-gear for motor-vehicles, the combination of the substantially-rectangular frame consisting of the front and rear axles and the side bars connecting them, the motor-casings supported at the rear by said rear axle and at the front by said side bars, and the motors carried by said casings and each geared to drive its adjacent rear wheel, substantially as described.

7. The combination with the substantially-rectangular running-gear frame and the two rear wheels turning on the rear axle thereof, of the two independent motors each geared to drive its adjacent rear wheel, substantially as described.

8. In a running-gear for motor-vehicles, the combination with the rear axle and the side bar connected thereto by a double swivel, of the motor-casing supported at its rear end by arms embracing the axle loosely on either side of the swivel and at its front end by the side bar, substantially as described.

9. The combination of the coupling-piece surrounding the axle, the two arms of the motor straddling the same and provided with grooves in their rear faces, the clamping-plates provided with corresponding grooves, and the axle provided with reduced cylindrical portions fitting within the said grooves, all for the purpose set forth, and substantially as described.

10. In a running-gear for motor-vehicles, the combination with the axle, of a motor and a spring-support carried thereby and a vehicle-wheel turning thereon, the said wheel having fast thereto a brake-drum and a drive-gear, the said motor having a drive-shaft and pinion, the latter in mesh with the drive-gear, and the said spring-support carrying brake mechanism for operating the brake-band upon the drum, substantially as described.

11. The combination with the axle, of the two vehicle-wheels rotating thereon, each wheel carrying a brake-drum and a drive-gear, means for independently operating each drive-gear, and means for actuating the drums, substantially as described.

In testimony whereof I have signed this specification in the presence of two subscribing witnesses.

ANDREW L. RIKER.

Witnesses:
 THOS. L. PROCTOR,
 C. A. L. MASSIE.